US008155638B2

(12) United States Patent
Jami et al.

(10) Patent No.: US 8,155,638 B2
(45) Date of Patent: Apr. 10, 2012

(54) ORTHOGONAL CODE NOISE SIMULATOR FOR HIGH SPEED DOWNLINK PACKET ACCESS

(75) Inventors: Iqbal Jami, Swindon (GB); Monica Casado-Fernandez, Nürnberg (DE); Stefan Brueck, Nürnberg (DE)

(73) Assignee: Alcatel Lucent, Paris (FR)

( * ) Notice: Subject to any disclaimer, the term of this patent is extended or adjusted under 35 U.S.C. 154(b) by 1270 days.

(21) Appl. No.: 11/646,791

(22) Filed: Dec. 28, 2006

(65) Prior Publication Data

US 2008/0160988 A1 Jul. 3, 2008

(51) Int. Cl.
*H04W 24/00* (2009.01)
*H04W 72/00* (2009.01)
*H04W 36/00* (2009.01)
*H04W 4/00* (2009.01)
*H04J 3/16* (2006.01)
*H04J 3/00* (2006.01)
*G06F 15/173* (2006.01)
*G06F 15/16* (2006.01)
*H04L 27/00* (2006.01)
*H04B 17/00* (2006.01)

(52) U.S. Cl. ............ 455/423; 455/450; 455/452.1; 455/442; 370/329; 370/469; 370/468; 370/464; 709/224; 709/223; 709/201; 375/295; 375/227

(58) Field of Classification Search ............ 455/423, 455/450
See application file for complete search history.

(56) References Cited

U.S. PATENT DOCUMENTS

| | | | |
|---|---|---|---|
| 6,799,213 B1 * | 9/2004 | Zhao et al. | 709/224 |
| 7,126,927 B2 | 10/2006 | Heijenk | |
| 7,408,952 B2 * | 8/2008 | Zhang et al. | 370/464 |
| 2003/0081692 A1 | 5/2003 | Kwan et al. | |
| 2003/0100299 A1 * | 5/2003 | Ko et al. | 455/423 |
| 2004/0071202 A1 | 4/2004 | Won et al. | |
| 2004/0073647 A1 * | 4/2004 | Gentile et al. | 709/223 |
| 2004/0199571 A1 * | 10/2004 | Spiegl et al. | 709/201 |
| 2004/0219920 A1 | 11/2004 | Love et al. | |
| 2005/0064872 A1 * | 3/2005 | Osseiran et al. | 455/452.1 |
| 2006/0039538 A1 * | 2/2006 | Minnis et al. | 379/1.01 |
| 2006/0092972 A1 | 5/2006 | Petrovic et al. | |
| 2006/0092973 A1 | 5/2006 | Petrovic et al. | |
| 2006/0211427 A1 | 9/2006 | Azman et al. | |
| 2007/0127522 A1 * | 6/2007 | Lundh et al. | 370/468 |
| 2007/0288625 A1 * | 12/2007 | Chakra et al. | 709/224 |
| 2008/0120521 A1 * | 5/2008 | Poisson et al. | 714/26 |
| 2008/0147370 A1 * | 6/2008 | Sjerling | 703/13 |

OTHER PUBLICATIONS

AEROFLEX: "HSDPA Multi-UE Option," UbiNetics, Aug. 30, 2006, p. 1-5, http://www.aeroflex.com/products/commtest/infrastructure/datasheets/Multi-UE.pdf.

(Continued)

*Primary Examiner* — Dwayne Bost
*Assistant Examiner* — Timothy Pham
(74) *Attorney, Agent, or Firm* — Harness, Dickey & Pierce, P.L.C.

(57) ABSTRACT

Disclosed is a system and method for testing mobile communications in a High Speed Downlink Packet Access (HSDPA) mobile communications network by generating one or more virtual users. Specifically, a high speed downlink shared channel is scheduled for a user (e.g., a real user or a virtual user) in a plurality of users. One or more network resources are then allocated by a virtual user executable module to the high speed downlink shared channel for a virtual user in the plurality of users.

23 Claims, 5 Drawing Sheets

OTHER PUBLICATIONS

"Universal Mobile Telecommunications System (UMTS); User Equipment (UE) Radio Transmission and Reception (FDD) (3GPP TS 25.101 Version 7.5.0 Release 7)", Oct. 2006.

R. Stuhlberger, et al., "HSDPA Performance Investigations Related to RF-Impairments," Wireless Technology, The 9th European Conf. on IEEE, Sep. 2006, p. 227-230.

PCT International Search Report corresponding to PCT Application PCT/US2007/025901 filed Dec. 18, 2007 (6 pages).

PCT Written Opinion of the International Searching Authority corresponding to PCT Patent Application PCT/US2007/025901 filed Dec. 18, 2007 (9 pages).

* cited by examiner

ORTHOGONAL CODE NOISE SIMULATOR FOR HIGH SPEED DOWNLINK PACKET ACCESS

BACKGROUND OF THE INVENTION

The present invention relates generally to mobile communications, and more specifically to the testing and optimization of a mobile communications network.

Mobile devices (also referred to as user equipment (UE)) that combine high speed mobile access with Internet Protocol (IP) based services (e.g., downloading data such as a web page or music) often communicate using a Universal Mobile Telecommunications System (UMTS) network. UMTS networks are the third generation of personal mobile communication. UMTS is a standard that integrates wireline and wireless systems to provide a universal communications service so that a user can move from place to place while maintaining access to a complete set of services. UMTS may enable a mobile device to use voice as well as transmit and receive data at high data rates such as 2 Mbps. Further, a UMTS network can use High Speed Downlink Packet Access (HSDPA), which changes data rate and resources according to the RF conditions of the UE.

When deploying a UMTS network, a network provider typically has to meet customer constraints described in a customer acceptance document (e.g., a customer contract warranty). In particular, a customer acceptance document typically specifies key performance indicators (KPIs) that the deployed network has to fulfill and the tests that need to be performed in order to measure those KPIs. The customer requires that the deployed UMTS network is measured against the warranted KPIs that are specified in the customer acceptance document. One KPI that is typically important is the capacity of a cell (and, therefore, the capacity of the UMTS network).

Many of the tests that need to be performed to test the UMTS network often require that the network is under load conditions equal to the warranted capacity. The load should be variable in time and power and the load should be uncorrelated in each cell. A UMTS load is often complex because of the mixture of services that are provided by the network.

As a recently deployed network has few real customers (if any), the remaining number of users needed to reach the warranted capacity has to be generated somehow. A realistic way of generating the warranted capacity is by spreading (typically a large number of) real users or terminals (i.e., mobile devices) around the network in a uniform and uncorrelated manner and let them move freely inside the network.

In most cases, however, such a large number of mobile devices are not available or easily accessible. Further, even if the required number of mobile devices could be obtained to run a test at the warranted capacity, the obtaining of the mobile devices may be very expensive for the network provider. Specifically, the network provider would have to purchase many mobile devices and would additionally have to hire a person to carry each mobile device in the network. This is likely very expensive and uncontrolled. Additionally, this solution may introduce large variances in the network, leading to large periods of measurements required in order to obtain reasonable averages. Furthermore, many test failures may occur, potentially resulting in many test repetitions.

Therefore, there remains a need to more efficiently and cost effectively test a UMTS network.

BRIEF SUMMARY OF THE INVENTION

In accordance with an aspect of the present invention, mobile communications in a High Speed Downlink Packet Access (HSDPA) mobile communications network are tested and optimized by generating one or more virtual users. Specifically, a high speed downlink shared channel is scheduled for a plurality of users (one or more virtual users and/or zero or more real users). One or more resource (e.g., power, codes, or data rate) is then allocated by a virtual user executable module to the high speed downlink shared channel for a virtual user in the plurality of users.

In one embodiment, a testing software module is configured to generate the virtual user. The testing software module can be configured based on received parameters that are associated with the virtual user. The virtual user executable module is then activated in response to a request associated with the virtual user.

In one embodiment, traffic to the virtual user is generated by the virtual user executable module. This generation of traffic may be based on a traffic model profile. Feedback from the virtual user can be simulated in response to the traffic. This may include generating a fixed channel quality indicator (CQI), specifying a statistic distribution for the fixed CQI that fits a real user endpoint CQI distribution, and specifying a file with real UE CQI distribution from measurements.

In one embodiment, the scheduling is performed by a HSDPA scheduler located in a Node B of the network. Further, the virtual user executable module may also be located in the Node B. The virtual user may be generated by an Operations and Maintenance Center (OMC-U). The OMC-U is in communication with the Node B via a radio network controller (RNC). The OMC-U may include a user interface configured to receive parameters that are received and used to generate the virtual user.

These and other advantages of the invention will be apparent to those of ordinary skill in the art by reference to the following detailed description and the accompanying drawings.

DETAILED DESCRIPTION

Figure 1:
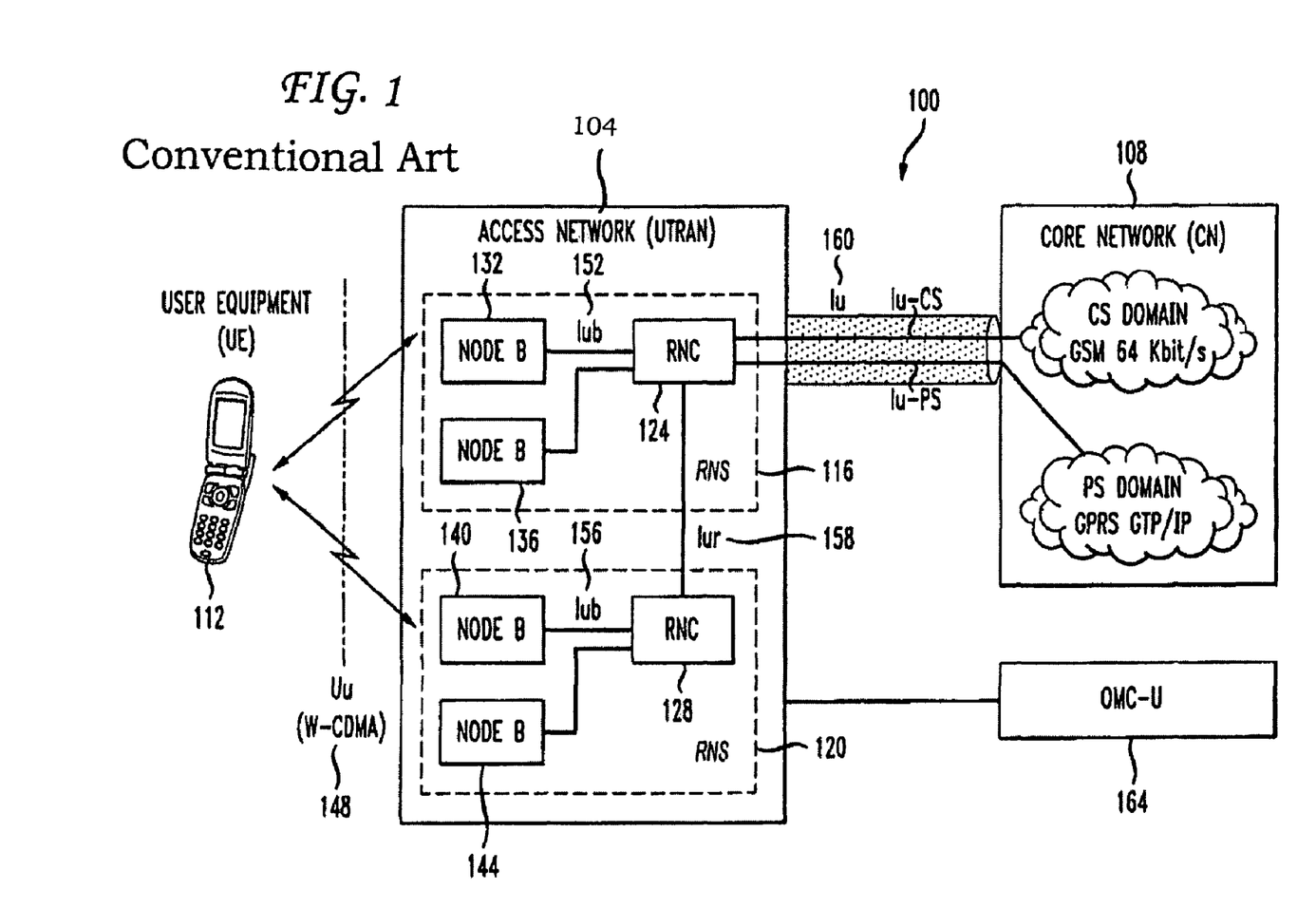
FIG. 1 shows a block diagram of a traditional Universal Mobile Telecommunications System (UMTS) network.

FIG. 1 shows a block diagram of a traditional Universal Mobile Telecommunications System (UMTS) network 100. The UMTS network 100 includes an access network 104 (also referred to as a UMTS Terrestrial Radio Access Network (UTRAN)) and a core network (CN) 108. UTRAN 104 allows a connection between user equipment (UE) 112, such as laptops, personal digital assistants, and wireless telephones (e.g., smartphones), and the CN 108 through a transport infrastructure (e.g., based on ATM).

The UTRAN 104 includes one or more Radio Network Subsystems (RNSs) (e.g., a first RNS 116 and a second RNS 120). Each RNS 116, 120 is responsible for the resources associated with a set of UMTS cells. Each RNS 116, 120 includes a respective radio network controller (RNC) 124, 128, and each RNC 124, 128 controls one or more Node Bs (i.e., basestations) (e.g., RNC 124 controls Node B 132, 136 and RNC 128 controls Node B 140, 144).

The UMTS specifications define a set of standardized logical interfaces inside UTRAN and between UTRAN and external entities (UE and CN). These interfaces are: Uu 148 (air interface connecting UE and Node B), Iub 152, 156 (connecting each Node B with its controlling RNC), Iur 158 (connecting each RNC) and Iu 160 (connecting RNC to a CN access node).

The RNC 124 and RNC 128 (and the Node Bs controlled by them) are often managed by an Operations and Maintenance Center (OMC-U) 164. The OMC-U typically controls and maintains the network and its components.

Figure 2:
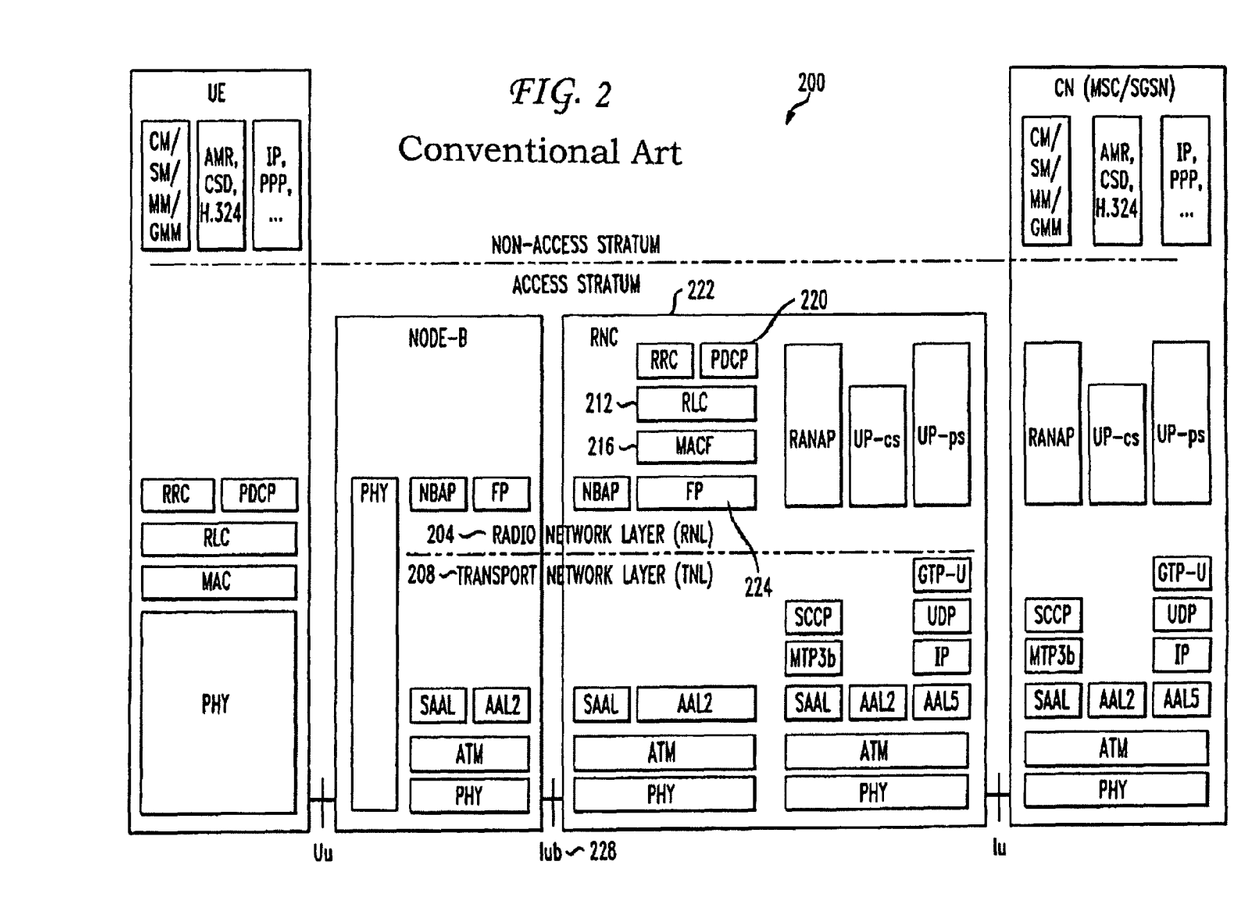
FIG. 2 shows a block diagram of UMTS Terrestrial Radio Access Network (UTRAN) protocol architecture.

FIG. 2 shows a block diagram of a UTRAN protocol architecture 200. UTRAN protocols used in terrestrial interfaces are often structured in two layers: Radio Network Layer (RNL) 204 and Transport Network Layer (TNL) 208. Inside RNL 204, the UMTS-specific protocols for UTRAN are defined, including the following radio protocols: Radio Link Control (RLC) 212, Medium Access Control (MAC) 216, and Packet Data Convergence Protocol (PDCP) 220 (of RNC 222). In the user plane, the Frame Protocol (FP) 224 is defined at Iub 228 and Iur interfaces to extend the radio transport channels from Node B to RNC, where radio frames are processed. Below RNL 204, the TNL 208 is in charge of conveying RNL data across the terrestrial interfaces of UTRAN.

High Speed Downlink Packet Access (HSDPA) has also been briefly described above. HSDPA is a UMTS technique that may enhance the capacity of the UMTS network and may also increase the user data rate. HSDPA is based on a shared channel technique. Specifically, in a system using HSDPA, a high capacity data channel (i.e., a high speed downlink shared channel, or HS-DSCH) is sent from the Node B to every user in the cell (e.g., in addition to other available channels). This shared channel is split into 15 sub-channels using scrambling codes and also by time allocation of the channel to different users in 2 millisecond timeslots called Transmission Time Intervals (TTIs). Each user is allocated a code to access the channel during the appropriate TTI and each user has access to an accompanying Downlink Control Channel. This carries the control information required by the UE in order to decode the data in the high capacity data channel at that time. As a result, HSDPA adapts the data rate of each user dynamically and quickly according to the RF conditions and traffic demands of each user at each instant of time (e.g., every 2 milliseconds). The RNC 222 may, for example, allocate resources for HSDPA users.

Figure 3:
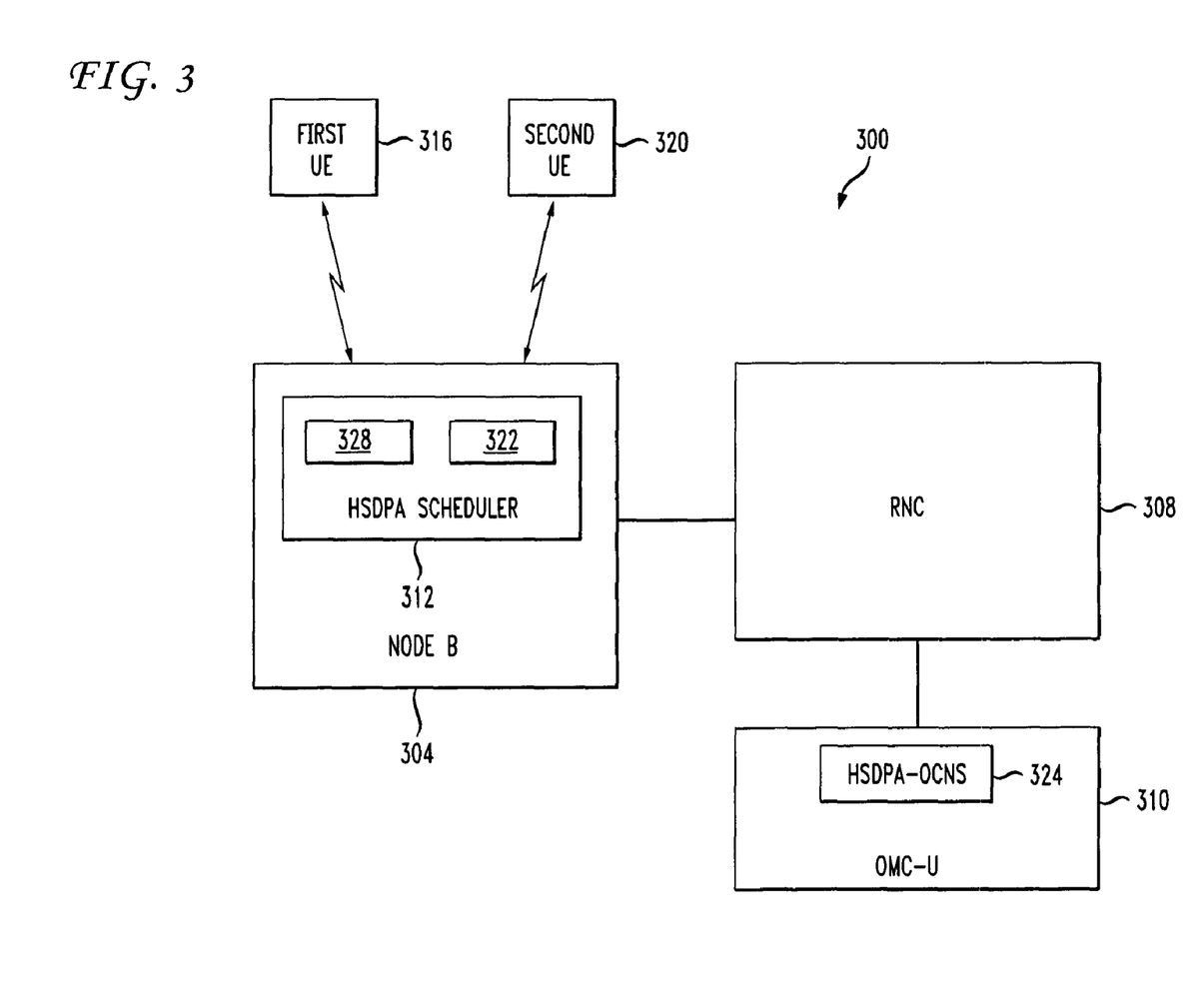
FIG. 3 shows a more detailed block diagram of a Node B in communication with a Radio Network Controller in a UMTS network in accordance with an embodiment of the present invention.

FIG. 3 shows a more detailed block diagram of a Node B 304 in communication with a RNC 308 in a UMTS network 300 in accordance with an embodiment of the present invention. As described above, the RNC 308 is in communication with the OMC-U 310.

The Node B 304 includes an HSDPA scheduler 312. The HSDPA scheduler 312 attempts to transmit a transmission to users (e.g., a first UE 316 and/or a second UE 320) with favorable radio conditions (e.g., a strong signal). The scheduler 312 typically determines overall HSDPA performance. For each TTI, the scheduler 312 decides to which users (e.g., first UE 316 and/or second UE 320) the HS-DSCH should be transmitted. Instead of sequentially allocating radio resources among UEs (round-robin scheduling), capacity may be increased significantly using channel-dependent scheduling. Channel-dependent scheduling attempts to transmit to UEs with favorable instantaneous channel conditions. The gain obtained by transmitting to UEs with favorable conditions is known as multi-user diversity.

Thus, the scheduler 312 can select the HSDPA UEs that transmit data in each TTI (e.g., each 2 millisecond interval). Therefore, the HSDPA scheduler 312 may contain a queue 322 of the HSDPA UEs. The HSDPA scheduler 312 may also determine the packet that the selected UE transmits (i.e., transmit a new packet or retransmit a packet previously transmitted). In one embodiment, each HSDPA user has several queues or processes. The scheduler 312 may also determine the data rate for each selected HSDPA UE by allocating a resource (e.g., power, number of codes, modulation and/or coding scheme) for the user.

The scheduler 312 additionally processes the feedback received from each HSDPA UE (e.g., an acknowledgement/nonacknowledgement (ACK/NACK) and/or a channel quality indicator (CQI), which represents the RF conditions of the UE). The decisions made by the scheduler 312 can be made based on the queue status of each user, the number of users, the traffic demand per user, and/or the feedback received from each UE.

In accordance with an aspect of the present invention, virtual HSDPA users are generated in the UMTS network. In response to these virtual users, the UMTS network allocates resources as if the virtual users were real users. In one embodiment, the OMC-U 310 provides a user interface for generating (and/or managing) a testing software module 324 (referred to herein as a HSDPA Orthogonal Code Noise Simulator (HSDPA-OCNS) 324). The HSDPA-OCNS simulates orthogonal code noise (as well as, for example, power) associated with a user to generate a virtual user. In one embodiment, each HSDPA-OCNS 324 generated corresponds to a virtual user.

The RNC 308 may set up the HSDPA-OCNS channels, allocating HSDPA resources and/or providing a unique identifier (H-RNTI) to each HSDPA user. Further, the RNC 308 may limit the HSDPA-OCNS channels to the maximum number of allowed real HSDPA users.

Figure 4:
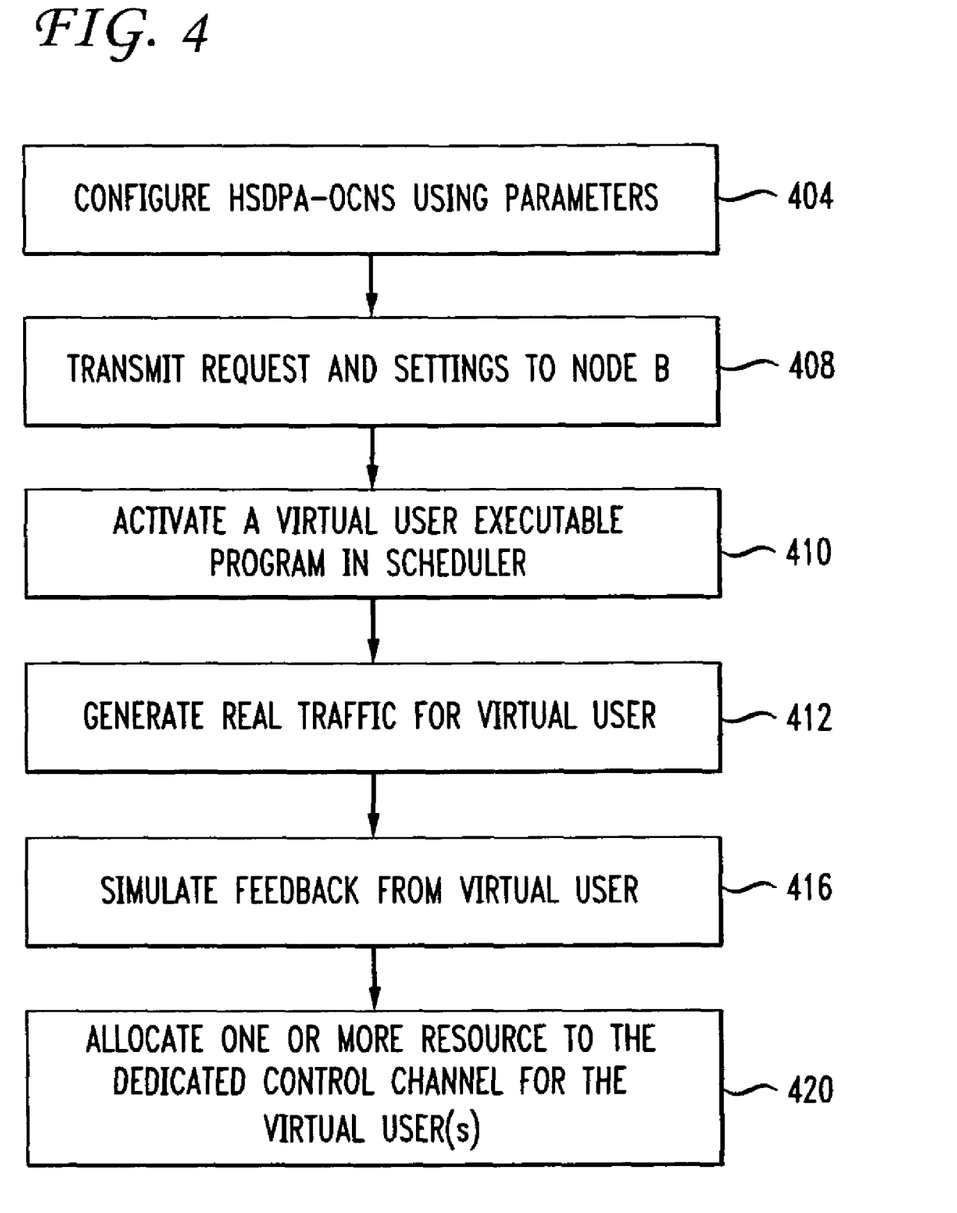
FIG. 4 shows a flowchart illustrating the steps performed to test a UMTS network in accordance with an embodiment of the present invention.

FIG. 4 shows a flowchart illustrating the steps performed to test a UMTS network (e.g., UMTS network 300 of FIG. 3) in accordance with an embodiment of the present invention. Parameters are received via a user interface on the OMC-U and used to configure a HSDPA-OCNS in step 404. In one embodiment, the OMC-U then transmits a request to the RNC 308. The RNC 308 may provide a unique identifier to each HSDPA-OCNS request as if it were a real HSDPA user. The RNC 308 may then transfer the HSDPA-OCNS request (which may include additional settings) to the Node B 304 in step 408.

In response to receiving the HSDPA-OCNS request, the Node B 304 activates (e.g., starts) a virtual user executable module 328 (e.g., program of the scheduler 312) in step 410. In one embodiment, the virtual user executable module 328 generates traffic for each virtual user in step 412. In one embodiment, the virtual user executable module 328 generates virtual users inside the HSDPA scheduler so that the scheduler algorithm 312 can schedule the virtual users together with the real users.

The virtual user executable module 328 can also simulate feedback from each virtual user in step 416 (e.g., so that the scheduler 312 can determine the required resources per virtual user). The executable module 328 may then feed this data back to the scheduler 312. The feedback may contain a CQI value, which is a measurement of the RF conditions of the UE. The executable module 328 may generate a fixed CQI value for a virtual user, specify a statistic distribution for the CQI generation that fits the real UE CQI distribution, and/or specifies a file with real UE CQI distribution data from measurements. The virtual user executable module 328 may also generate the ACK/NACK feedback from the UE every TTI. In one embodiment, a parameter (specified above in step 404) defines the ACK/NACK ratio (e.g., in percentage) to be simulated over the air interface. The ACK/NACK ratio can indicate the amount of positive and negative acknowledgement of the packets. This may be used to trigger re-transmissions when a packet is a NACK.

In one embodiment, the virtual user executable module 328 generates traffic for each virtual user and injects each virtual user into the user queue 322 of the HSDPA scheduler 312. In one embodiment, the traffic per user is generated for each user according to a traffic model profile. The traffic model profile may be specified as part of the parameters in step 404. As a result, a realistic traffic profile can be generated for each virtual HSDPA user. A number of MAC-d PDUs (i.e., Packet Data Unit delivered from the MAC-d layer to the MAC-hs layer. The MAC-hs is where the HSDPA scheduler 312 resides, and it will convert the MAC-d PDUs into MAC-hs PDUs) may also be generated from the traffic model parameters. The scheduler 312 can map the MAC-d PDUs to a maximum transport block size within the scheduler 312 for every TTI.

Traffic model parameters can include, for example, minimum burst on time, maximum burst on time, minimum bust off time, maximum burst off time, think time, and/or number of packets in a burst. In more detail, minimum and maximum burst on time are the minimum and maximum time of the duration of a data packet generated by a simulated user. Minimum and maximum burst off time are the minimum and maximum time of the duration of the inactive time between data packets generated for a virtual user. The think time is the average time of the duration of a pause between two bursts of packets. The number of packets in a burst are the number of data packets sent/generated for a user. The bursts are separated by the think time.

In one embodiment, the HSDPA scheduler 312 is not able to determine that the HSDPA-OCNS is a virtual user rather than a real user. Instead, the HSDPA scheduler 312 allocates one or more resource (e.g., power, code, data rate and/or network resource) for the virtual user in step 420 in the same way as the scheduler 312 does for a real user. In this way, the HSDPA-OCNS acts as a realistic HSDPA load (not only in the air interface (as additional power and code noise) but also inside the scheduler).

As described, the HSDPA capability of the UE can be simulated via a virtual user. In one embodiment, many different HSDPA UE types (e.g., smartphone or personal digital assistant) can be simulated. In one embodiment, the HSDPA-OCNS 324 can select whether the virtual HSDPA user is capable of multi-user diversity.

The HSDPA-OCNS enables the testing of the UMTS at the warranted capacity as per the customer contract in a controlled environment. Therefore, measurement inaccuracies, testing, and practicality problems are reduced/eliminated due to the generation of virtual users. Further, the HSDPA-OCNS enables testing of many controlled scenarios with a real load that is easy to specify. The HSDPA-OCNS may also enable the calibration of transmit power of HSDPA downlink channels based on fixed CQI input. Additionally, the modulation pattern of the transmitted symbols may be controlled to analyze peak to average ratio of the transmitted chip level signal (e.g., through a spectrum analyzer).

Figure 5:
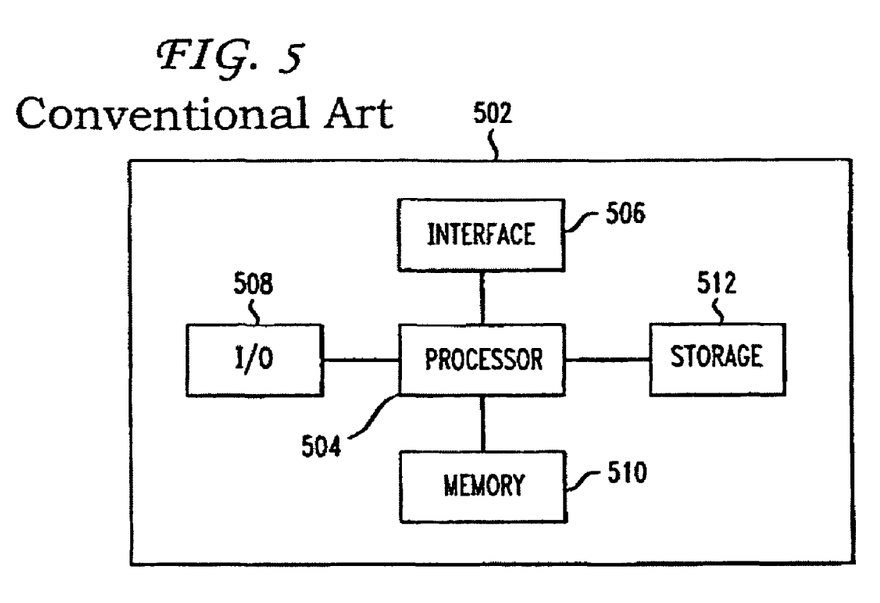
FIG. 5 is a high level block diagram of a computer in accordance with an embodiment of the invention.

The prior description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 5. Computer 502 contains a processor 504 which controls the overall operation of computer 502 by executing computer program instructions which define such operation. The computer program instructions may be stored in a storage device 512 (e.g., magnetic disk) and loaded into memory 510 when execution of the computer program instructions is desired. Computer 502 also includes one or more interfaces 506 for communicating with other devices (e.g., locally or via a network). Computer 502 also includes input/output 508 which represents devices which allow for user interaction with the computer 502 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes. For example, computer 502 may represent the OMC-U 310, the HSDPA-OCNS 324, the RNC 308, and/or the Node B 304. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for testing and optimizing mobile communications in a High Speed Downlink Packet Access (HSDPA) mobile communications network comprising:
   scheduling, at a HSDPA scheduler, a high speed downlink shared channel for a plurality of users;
   allocating, by a virtual user executable module in the HSDPA scheduler, resources to said high speed downlink shared channel for a virtual user in said plurality of users, the virtual user executable module being a testing software module;
   generating traffic, by the virtual user executable module in the HSDPA scheduler, to the virtual user;
   simulating feedback, by the virtual user executable module in the HSDPA scheduler, from said virtual user in response to said traffic, said simulating feedback including at least one of generating a fixed channel quality indicator (CQI), specifying a statistic distribution for the fixed CQI that fits a real user endpoint (UE) CQI distribution, and specifying a file with real UE CQI distribution from measurements; and
   implementing a transmit power of the high speed downlink shared channel based on the simulated feedback.

2. The method of claim 1 further comprising:
activating said virtual user executable module in response to a request associated with said virtual user, the virtual user executable module being located in a HSDPA scheduler.

3. The method of claim 2, wherein the virtual user executable module is configured to receive parameters associated with said virtual user.

4. The method of claim 1 wherein said generating traffic for said virtual user further comprises generating traffic according to a traffic model profile.

5. The method of claim 1 further comprising injecting said virtual user into a user queue.

6. An apparatus for testing and optimizing mobile communications in a High Speed Downlink Packet Access (HSDPA) mobile communications network comprising:
a Node B comprising:
a HSDPA scheduler configured to schedule a high speed downlink shared channel to a plurality of users;
a virtual user executable module configured to allocate resources to said high speed downlink shared channel for a virtual user in said plurality of users, the virtual user executable module being a testing software module,
wherein said virtual user executable module is further configured to at least one of generate a fixed channel quality indicator (CQI), specify a statistic distribution for the fixed CQI that fits a real user endpoint (UE) CQI distribution, and specify a file with real UE CQI distribution from measurements.

7. The apparatus of claim 6 further comprising an Operations and Maintenance Center (OMC-U) configured to generate said virtual user, the virtual user executable module being located in the HSDPA scheduler.

8. The apparatus of claim 7 wherein said OMC-U further comprises a user interface configured to receive parameters associated with said virtual user.

9. The apparatus of claim 7 further comprising a radio network controller in communication with said OMC-U and said Node B and configured to receive a request associated with said virtual user from said OMC-U and to transmit said request to said Node B.

10. The apparatus of claim 6 wherein said virtual user executable module is further configured to generate traffic to said virtual user.

11. The apparatus of claim 10 wherein said virtual user executable module is further configured to generate traffic according to a traffic model profile.

12. The apparatus of claim 10 wherein said virtual user executable module is further configured to simulate feedback from said virtual user in response to said traffic.

13. The apparatus of claim 12 wherein said virtual user executable module is further configured to generate acknowledgement/nonacknowledgement feedback from said virtual user each transmission time interval (TTI).

14. The apparatus of claim 6 wherein said virtual user executable module is further configured to inject said virtual user into a user queue of the HSDPA scheduler.

15. The apparatus of claim 6 wherein said plurality of users further comprises at least one virtual user and at least one real user.

16. An apparatus for testing and optimizing mobile communications in a High Speed Downlink Packet Access (HSDPA) mobile communications network comprising:
a Node B comprising:
means for scheduling a high speed downlink shared channel for a plurality of users;
means for allocating resources to said high speed downlink shared channel for a virtual user in said plurality of users,
wherein said means for allocating further comprises at least one of means for generating a fixed channel quality indicator (CQI), means for specifying a statistic distribution for the fixed CQI that fits a real user endpoint (UE) CQI distribution, and means for specifying a file with real UE CQI distribution from measurements.

17. The apparatus of claim 16 further comprising means for generating said virtual user.

18. The apparatus of claim 17 wherein said means for generating said virtual user further comprises means for receiving parameters associated with said virtual user.

19. The apparatus of claim 17 further comprising means for receiving a request associated with said virtual user.

20. The apparatus of claim 16 wherein said means for allocating further comprises means for generating traffic to said virtual user.

21. The apparatus of claim 20 wherein said means for allocating further comprises means for generating traffic according to a traffic model profile.

22. The apparatus of claim 20 wherein said means for allocating further comprises means for simulating feedback from said virtual user in response to said traffic.

23. The apparatus of claim 22 wherein said means for allocating further comprises generating acknowledgement/nonacknowledgement feedback from said virtual user each transmission time interval (TTI).

* * * * *